(12) United States Patent
Goredema et al.

(10) Patent No.: US 7,563,313 B2
(45) Date of Patent: Jul. 21, 2009

(54) INK CARRIERS, PHASE CHANGE INKS INCLUDING SAME AND METHODS FOR MAKING SAME

(75) Inventors: Adela Goredema, Mississauga (CA); Christine E. Bedford, Burlington (CA); Marcel P. Breton, Mississauga (CA); Christopher Wagner, Toronto (CA)

(73) Assignee: Xerox Corporation, Norwalk, CT (US)

( * ) Notice: Subject to any disclaimer, the term of this patent is extended or adjusted under 35 U.S.C. 154(b) by 626 days.

(21) Appl. No.: 11/181,632

(22) Filed: Jul. 13, 2005

(65) Prior Publication Data

US 2007/0012217 A1    Jan. 18, 2007

(51) Int. Cl.
*C09D 11/00* (2006.01)
(52) U.S. Cl. .................................. 106/31.29
(58) Field of Classification Search ................. 430/137; 523/160; 528/310
See application file for complete search history.

(56) References Cited

U.S. PATENT DOCUMENTS

| | | | |
|---|---|---|---|
| 4,889,560 A | 12/1989 | Jaeger et al. | |
| 4,889,761 A | 12/1989 | Titterington et al. | |
| 5,084,099 A * | 1/1992 | Jaeger et al. | 106/31.29 |
| 5,221,335 A | 6/1993 | Williams et al. | |
| 5,372,852 A | 12/1994 | Titterington et al. | |
| 5,496,879 A | 3/1996 | Griebel et al. | |
| 5,545,504 A * | 8/1996 | Keoshkerian et al. | 430/137.17 |
| 5,621,022 A | 4/1997 | Jaeger et al. | |
| 5,783,657 A | 7/1998 | Pavlin et al. | |
| 5,998,570 A * | 12/1999 | Pavlin et al. | 528/310 |
| 6,111,055 A * | 8/2000 | Berger et al. | 528/310 |
| 6,471,758 B1 * | 10/2002 | Kelderman et al. | 106/31.29 |
| 2002/0173611 A1 * | 11/2002 | Percec et al. | 526/344 |
| 2004/0102540 A1 * | 5/2004 | Jaeger et al. | 523/160 |

FOREIGN PATENT DOCUMENTS

| | | |
|---|---|---|
| DE | 4205636AL | 2/1992 |
| DE | 4205713AL | 2/1992 |
| WO | WO98/17705 | 4/1998 |
| WO | WO0052097 | * 1/2000 |

OTHER PUBLICATIONS

Minoda, Sequence- regulated oligomers and polymers by living catonic polymerization, 1990, Polymer Bulletin 23, 133-139.*

* cited by examiner

*Primary Examiner*—Melvin C Mayes
*Assistant Examiner*—Stefanie Cohen
(74) *Attorney, Agent, or Firm*—Marger Johnson & McCollom, PC

(57) ABSTRACT

Disclosed is an ink carrier comprising an ester terminated oligo-amide material having a substantially low polydispersity. This ink carrier can be combined with a colorant to produce an ink composition.

21 Claims, No Drawings

INK CARRIERS, PHASE CHANGE INKS INCLUDING SAME AND METHODS FOR MAKING SAME

BACKGROUND

Disclosed herein are ink carriers, phase change inks and methods for making same. More specifically, disclosed herein are ink carriers including ester terminated oligo-amide materials, and phase change inks including such ink carriers which can be used in direct and indirect printing processes. One embodiment of this disclosure is directed to a phase change ink composition comprising an ink carrier which comprises (1) an ester terminated oligo-amide material having a substantially low polydispersity, as hereinafter defined, and (2) a colorant. Another embodiment is directed to a method which comprises (a) incorporating into an ink jet printing apparatus a phase change ink composition comprising a phase change ink carrier (1) the ester terminated oligo-amide material having a substantially low polydispersity, and (2) a colorant; (b) melting the ink; (c) causing droplets of the melted ink to be ejected in an imagewise pattern; and (d) transferring the ink in the imagewise pattern to a final recording substrate.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. Nos. 4,889,560, 4,889,761, and 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labeling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known and are described in U.S. patent application Ser. No. 10/881,047, the disclosure of which is totally incorporated herein by reference.

U.S. Pat. Nos. 5,783,657, 5,998,570 and WO 98/17705, (Pavlin et al), the disclosure of which is totally incorporated herein by reference, discloses a low molecular weight, ester-terminated polyamide that may be blended with a liquid hydrocarbon to form a transparent composition having gel consistency. The ester-terminated polyamide is prepared by reacting "x" equivalents of dicarboxylic acid wherein at least 50 percent of those equivalents are from polymerized fatty acid, "y" equivalents of diamine such as ethylene diamine, and "z" equivalents of monoalcohol having at least 4 carbon atoms. The stoichiometry of the reaction mixture is such that $0.9 \leq \{x/(y+z)\} \leq 1.1$ and $0.1 \leq \{z/(y+z)\} \leq 0.7$. The reactants are heated until they reach reaction equilibrium.

U.S. Pat. No. 6,111,055 (Berger, et al), the disclosure of which is totally incorporated herein by reference, discloses an ester terminated dimer acid-based polyamide which is blended with a solvent to form a gel. The solvent may be flammable, and a wick may be added to the resulting gel to form a candle. The said ester terminated dimeracid-based polyamide is prepared by thermal condensation of a diacid, a diamine and a monoalcohol.

A need remains for improved phase change inks, and more specifically, low energy solid inks which permit phase change ink jet printers to perform at more moderate operating conditions than with conventional phase change inks. For example, a need exists for phase change inks which can be jetted at temperature lower than conventional jetting temperature as described below. Also, there is a need for phase change inks having a lower melt viscosity at this lower temperature range. In addition, a need remains for phase change inks which exhibit more control over the molecular weight of some of the ink components. A need also remains for certain ink components to exhibit a narrow polydispersity and thereby reduce the amount of mixed phase components which will expand their overall applicability in solid ink technology. Further, a need remains for phase change inks that exhibit good scratch and fold resistance. Additionally, a need remains for phase change inks that print successfully on paper and transparency stock. In addition, there is a need for phase change inks that generate prints with good performance in automatic document feeders.

SUMMARY

Many phase change inks currently being used in solid ink jet piezoelectric printers require high jetting temperatures (about 140 degrees C.) and long warm up times. The images currently produced by these inks can also, in many instances, exhibit poor scratch resistance and image permanence.

Disclosed herein is an ink carrier which is used in forming a phase change ink composition, the ink carrier can comprise an ester terminated oligo-amide compound having a substantially low polydispersity. One embodiment is directed to a phase change ink composition comprising a phase change ink carrier and an ester-terminated oligo-amide compound. The ester terminated oligo-amide can be produced by sequentially controlled polymerization. Another embodiment of this disclosure is directed to a method which comprises (a) incorporating into an ink jet printing apparatus an ink composition comprising (1) an ink carrier comprising a first component which comprises an ester terminated oligo-amide material having a substantially low polydispersity; and (2) a colorant; (b) melting the ink; and (c) causing droplets of the melted ink to be ejected in an imagewise pattern onto a substrate.

DETAILED DESCRIPTION

An ink carrier can be provided comprising an ester terminated oligo-amide having a substantially low polydispersity. In one specific embodiment, the inks have a polydispersity of about 1.80 or lower. An ink compositions of the present disclosure, which can be referred to as phase change inks, can comprise (1) an ester terminated oligo-amide material having a substantially low polydispersity; and (2) a colorant. An oligomer for purpose of this disclosure is a polymer comprised of only a minimum number of monomer units such as a dimer, trimer, tetramer, etc., or their mixtures. The upper limit of repeating units in an oligomer can be up to about ten. Oligo-amides in these embodiments refers, for example, to a relatively low molecular weight polyamide. This low molecular weight polyamide is end-capped by an ester.

Polydispersity is described in the text entitled Principles of Polymerizaion, Odian, $3^{rd}$ Edition, 1991, and more specifically "polydispersity refers for example, to the ratio of the weight average molecular weight (Mw) to the number average molecular weight (Mn). It indicates the distribution of individual molecular weights in a batch of polymers. As the polymer chains approach uniform chain length, the polydispersity approaches 1. The weight average molecular weight ($M_w$) is a way of describing the molecular weight of a polymer. Polymer molecules, even if of the same type, come in different sizes (chain lengths, for linear polymers). Thus, this causes an average of some kind to be promulgated. For the weight average molecular weight, this is calculated by the formula.

$$M_w = \frac{\sum_i N_i M_i^2}{\sum_i N_i M_i}$$

where $N_i$ is the number of molecules of molecular weight $M_i$. If the weight average molecular weight is w, and a random monomer can be selected, then the resultant polymer will have a weight of w on average. The weight average molecular weight can be determined by light scattering, small angle neutron scattering (SANS), X-ray scattering, and sedimentation velocity In one embodiment $M_w$ is at least about 2,000, in another embodiment $M_w$ at least about 3,000, and in a further embodiment $M_w$ is at least about 4,000, and in one embodiment $M_w$ is not more than about 20,000, in another embodiment $M_w$ is not more than about 15,000, and in a further embodiment $M_w$ is not more than about 10,000.

The number average molecular weight ($M_n$) for purposes of this disclosure can be a way of determining the molecular weight of a polymer. Polymer molecules, even ones of the same type, can come in different sizes (chain lengths, for linear polymers), so the average molecular weight will depend on the method of averaging. The number average molecular weight is the common average of the molecular weights of the individual polymers. It is determined by measuring the molecular weight of n polymer molecules, summing the weights, and dividing by n.

$$Mn = \frac{\sum NiMi}{\sum Ni}$$

The number average molecular weight of a polymer can be determined by osmometry, end-group titration, and colligative properties. In one embodiment $M_n$ is at least about 1,500, in another embodiment $M_n$ at least about 2,000, and in a further embodiment $M_n$ is at least about 2,500, and in one embodiment $M_n$ is not more than about 8,000, in another embodiment $M_n$ is not more than about 7,000, and in a further embodiment $M_n$ is not more than about 6,000.

In one embodiment of this invention the ester terminated oligo-amide material is produced by sequential controlled polymerization. Sequential controlled polymerization involves the sequential addition of the monomer units. Sequence controlled polymerization is reported in "Sequence-Regulated Oligomers and Polymers by Living Cationic Polymerization. 2. Principles of Sequence Regulation and synthesis of Sequence-Regulated Oligomers of Functional Vinyl Ethers and Styrene Derivatives", Minoda, M. et al., Macromolecules, 1990, 23, No 5, pp. 4889-4895, the disclosure of which is totally incorporated herein by references. This report describes synthesis of vinyl ether oligomers with controlled repeat unit sequence by living cationic polymerization initiated with the hydrogen iodide/zinc iodide ($HI/ZnI_2$) system. The synthesis involved the sequential and successive reactions of two, three, or four vinyl ethers (each equimolar to hydrogen iodide) in toluene at -40 to -78° C. The repeat unit sequence was controlled by the order of monomer addition.

Some embodiments of ink carriers and inks disclosed herein can, in some instances, meet some the above described unresolved needs. Disclosed are novel ink carriers and phase change inks formed there from. These ink carriers can comprise the above ester terminated oligo-amides having a low polydispersity. These inks can also include waxes, typically low melting waxes. The oligomeric amides can be prepared by sequentially controlled polymerization. The prior art ester terminated oligo-amides are synthesized by thermal condensation and the resulting products have higher polydispersity thereby limiting their applications in solid ink technology. Another disadvantage of the thermal condensation is the possibility of darkening of the oligomers as a result of amine oxidation which is undesirable for ink formulation. Unlike the traditional thermal condensation method conventionally employed to form oligomeric amides, this disclosure provides oligomers with controlled molecular weight and narrow polydispersity. Narrow polydispersity of the oligo-amide material can enable toughness characteristics in the inks containing these oligo-amides.

The ester terminated oligo-amide material in one embodiment has the following formula

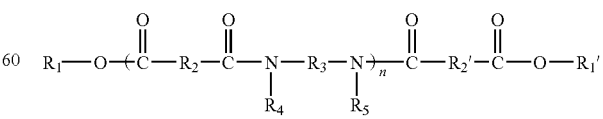

wherein n represents the number of repeating segments. In a further embodiment, n is an integer of 1, 2, 3, 4, 5, 6, 7, 8, 9 or 10. In yet a further embodiment, n is 2, 4, or 6. In one embodiment, $R_1$ and $R_1'$ are each, independently selected from the group comprising alkyl. In another embodiment, $R_1$ and $R_1'$ are each, independently, linear alkyl groups, branched alkyl groups, saturated alkyl groups, unsaturated alkyl groups, cyclic alkyl groups, substituted alkyl groups, unsubstituted alkyl groups, alkyl groups having hetero atoms, or aryl groups, or mixtures thereof. In a further embodiment, $R_2$ is and $R_2'$ are each, independently, each, alkylene, arylene, alkylarylene and arylalkylene, or mixtures thereof. In another embodiment, $R_3$ is alkylene, arylene, arylalkylene or alkylarylene, or mixtures thereof. In yet another embodiment, $R_4$ is and $R_5$ are each, independently, each, hydrogen or alkyl.

In another embodiment of this disclosure, $R_1$ and $R_1'$ is each, independently of the other, (i) an alkyl group (including linear, branched, saturated, unsaturated, cyclic, substituted, and unsubstituted alkyl groups, and wherein hetero atoms, such as oxygen, nitrogen, sulfur, silicon, phosphorus, boron, and the like either may or may not be present in the alkyl group), in one embodiment with at least 1 carbon atom, in another embodiment with at least about 4 carbon atoms, and in yet another embodiment with at least about 10 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, including (but not limited to) (1) linear saturated unsubstituted aliphatic groups containing no hetero atoms, (2) branched saturated unsubstituted aliphatic groups containing no hetero atoms, (3) cyclic saturated unsubstituted aliphatic groups containing no hetero atoms, (4) aliphatic groups containing both cyclic and acyclic portions, said aliphatic groups being saturated, unsubstituted, and containing no hetero atoms, (5) linear ethylenically unsaturated unsubstituted aliphatic groups containing no hetero atoms, (6) branched ethylenically unsaturated unsubstituted aliphatic groups containing no hetero atoms, (7) cyclic ethylenically unsaturated unsubstituted aliphatic groups containing no hetero atoms, (8) aliphatic groups containing both cyclic and acyclic portions, said aliphatic groups being ethylenically unsaturated, unsubstituted, and containing no hetero atoms, (9) linear saturated substituted aliphatic groups containing no hetero atoms, (10) branched saturated substituted aliphatic groups containing no hetero atoms, (11) cyclic saturated substituted aliphatic groups containing no hetero atoms, (12) aliphatic groups containing both cyclic and acyclic portions, said aliphatic groups being saturated, substituted, and containing no hetero atoms, (13) linear ethylenically unsaturated substituted aliphatic groups containing no hetero atoms, (14) branched ethylenically unsaturated substituted aliphatic groups containing no hetero atoms, (15) cyclic ethylenically unsaturated substituted aliphatic groups containing no hetero atoms, (16) aliphatic groups containing both cyclic and acyclic portions, said aliphatic groups being ethylenically unsaturated, substituted, and containing no hetero atoms, (17) linear saturated unsubstituted aliphatic groups containing hetero atoms, (18) branched saturated unsubstituted aliphatic groups containing hetero atoms, (19) cyclic saturated unsubstituted aliphatic groups containing hetero atoms, (20) aliphatic groups containing both cyclic and acyclic portions, said aliphatic groups being saturated, unsubstituted, and containing hetero atoms, (21) linear ethylenically unsaturated unsubstituted aliphatic groups containing hetero atoms, (22) branched ethylenically unsaturated unsubstituted aliphatic groups containing hetero atoms, (23) cyclic ethylenically unsaturated unsubstituted aliphatic groups containing hetero atoms, (24) aliphatic groups containing both cyclic and acyclic portions, said aliphatic groups being ethylenically unsaturated, unsubstituted, and containing hetero atoms, (25) linear saturated substituted aliphatic groups containing hetero atoms, (26) branched saturated substituted aliphatic groups containing hetero atoms, (27) cyclic saturated substituted aliphatic groups containing hetero atoms, (28) aliphatic groups containing both cyclic and acyclic portions, said aliphatic groups being saturated, substituted, and containing hetero atoms, (29) linear ethylenically unsaturated substituted aliphatic groups containing hetero atoms, (30) branched ethylenically unsaturated substituted aliphatic groups containing hetero atoms, (31) cyclic ethylenically unsaturated substituted aliphatic groups containing hetero atoms, and (32) aliphatic groups containing both cyclic and acyclic portions, said aliphatic groups being ethylenically unsaturated, substituted, and containing hetero atoms, (ii) an aryl group (including substituted and unsubstituted aryl groups, and wherein hetero atoms, such as oxygen, nitrogen, sulfur, silicon, phosphorus, boron, and the like either may or may not be present in the aryl group), in one embodiment with at least about 5 carbon atoms, and in another embodiment with at least about 6 carbon atoms, and in one embodiment with no more than about 18 carbon atoms, in another embodiment with no more than about 12 carbon atoms, and in yet another embodiment with no more than about 6 carbon atoms, although the number of carbon atoms can be outside of these ranges, (iii) an arylalkyl group (including substituted and unsubstituted arylalkyl groups, and wherein hetero atoms, such as oxygen, nitrogen, sulfur, silicon, phosphorus, boron, and the like either may or may not be present in either the aryl or the alkyl portion of the arylalkyl group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as benzyl or the like, or (iv) an alkylaryl group (including substituted and unsubstituted alkylaryl groups, and wherein hetero atoms, such as oxygen, nitrogen, sulfur, silicon, phosphorus, boron, and the like either may or may not be present in either the aryl or the alkyl portion of the alkylaryl group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, $R_2$ and $R_2'$ is each, independently of the other, (i) an alkylene group (including linear, branched, saturated, unsaturated, cyclic, substituted, and unsubstituted alkylene groups, and wherein hetero atoms, such as oxygen, nitrogen, sulfur, silicon, phosphorus, boron, and the like either may or may not be present in the alkylene group), in one embodiment with at least about 2 carbon atoms, in another embodiment with at least about 4 carbon atoms, in yet another embodiment with at least about 6 carbon atoms, in still another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with about 20 carbon atoms, in another embodiment with at least about 22 carbon atoms, in yet another embodiment with at least about 24 carbon atoms, in still another embodiment with about 26 carbon atoms, in another embodiment with at least about 28 carbon atoms, in yet another embodiment with at least about 30 carbon atoms, in still another embodiment with about 32 carbon atoms, in another embodiment with at least about 34 carbon atoms, and in yet another embodiment with at least about 36 carbon atoms, and in one embodiment with no more than about 100 carbon atoms, in another embodiment with no more than about 80 carbon atoms, and in yet another embodiment with no more than about 60 carbon atoms, and in yet another embodiment with no more than about 50 carbon atoms although the number of carbon atoms can be outside of these ranges, including (but not limited to) (1) linear saturated unsubstituted aliphatic groups containing no hetero atoms, (2) branched saturated unsubstituted aliphatic groups containing no hetero atoms, (3) cyclic saturated unsubstituted aliphatic groups containing no hetero atoms, (4) aliphatic groups containing both cyclic and acyclic portions, said aliphatic groups being saturated, unsubstituted, and containing no hetero atoms, (5) linear ethylenically unsaturated unsubstituted aliphatic groups containing no hetero atoms, (6) branched ethylenically unsaturated unsubstituted aliphatic groups containing no hetero atoms, (7) cyclic ethylenically unsaturated unsubstituted aliphatic groups containing no hetero atoms, (8) aliphatic groups containing both cyclic and acyclic portions, said aliphatic groups being ethylenically unsaturated, unsubstituted, and containing no hetero atoms, (9) linear saturated substituted aliphatic groups containing no hetero atoms, (10) branched saturated substituted aliphatic groups containing no hetero atoms, (11) cyclic saturated substituted aliphatic groups containing no hetero atoms, (12) aliphatic groups containing both cyclic and acyclic portions, said aliphatic groups being saturated, substituted, and containing no hetero atoms, (13) linear ethylenically unsaturated substituted aliphatic groups containing no hetero atoms, (14) branched ethylenically unsaturated substituted aliphatic groups containing no hetero atoms, (15) cyclic ethylenically unsaturated substituted aliphatic groups containing no hetero atoms, (16) aliphatic groups containing both cyclic and acyclic portions, said aliphatic groups being ethylenically unsaturated, substituted, and contain no hetero atoms, (17) linear saturated unsubstituted aliphatic groups containing hetero atoms, (18) branched saturated unsubstituted aliphatic groups containing hetero atoms, (19) cyclic saturated unsubstituted aliphatic groups containing hetero atoms, (20) aliphatic groups containing both cyclic and acyclic portions, said aliphatic groups being saturated, unsubstituted, and containing hetero atoms, (21) linear ethylenically unsaturated unsubstituted aliphatic groups containing hetero atoms, (22) branched ethylenically unsaturated unsubstituted aliphatic groups containing hetero atoms, (23) cyclic ethylenically unsaturated unsubstituted aliphatic groups containing hetero atoms, (24) aliphatic groups containing both cyclic and acyclic portions, said aliphatic groups being ethylenically unsaturated, unsubstituted, and containing hetero atoms, (25) linear saturated substituted aliphatic groups containing hetero atoms, (26) branched saturated substituted aliphatic groups containing hetero atoms, (27) cyclic saturated substituted aliphatic groups containing hetero atoms, (28) aliphatic groups containing both cyclic and acyclic portions, said aliphatic groups being saturated, substituted, and containing hetero atoms, (29) linear ethylenically unsaturated substituted aliphatic groups containing hetero atoms, (30) branched ethylenically unsaturated substituted aliphatic groups containing hetero atoms, (31) cyclic ethylenically unsaturated substituted aliphatic groups containing hetero atoms, and (32) aliphatic groups containing both cyclic and acyclic portions, said aliphatic groups being ethylenically unsaturated, substituted, and containing hetero atoms, (ii) an arylene group (including substituted and unsubstituted arylene groups, and wherein hetero atoms, such as oxygen, nitrogen, sulfur, silicon, phosphorus, boron, and the like either may or may not be present in the arylene group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, (iii) an arylalkylene group (including substituted and unsubstituted arylalkylene groups, and wherein hetero atoms, such as oxygen, nitrogen, sulfur, silicon, phosphorus, boron, and the like either may or may not be present in either the aryl or the alkyl portion of the arylalkylene group), in one embodiment with at least about 6 carbon atoms, and in another embodiment with at least about 7 carbon atoms, and in one embodiment with no more than about 100 carbon atoms, in another embodiment with no more than about 80 carbon atoms, and in yet another embodiment with no more than about 50 carbon atoms, although the number of carbon atoms can be outside of these ranges, including (a) arylalkylene groups wherein both the aryl and the alkyl portions form the linkage between the two CO groups, such as

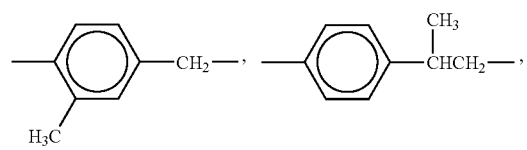

and the like, and (b) arylalkylene groups wherein only the alkyl portion forms the linkage between the two CO groups, such as

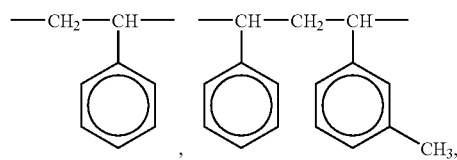

and the like, or (iv) an alkylarylene group (including substituted and unsubstituted alkylarylene groups, and wherein hetero atoms, such as oxygen, nitrogen, sulfur, silicon, phosphorus, boron, and the like either may or may not be present in either the aryl or the alkyl portion of the alkylarylene group), in one embodiment with at least about 7 carbon atoms, and in another embodiment with at least about 14 carbon atoms, and in one embodiment with no more than about 100 carbon atoms, in another embodiment with no more than about 80 carbon atoms, and in yet another embodiment with no more than about 50 carbon atoms, although the number of carbon atoms can be outside of these ranges, such as tolylene or the like, including (a) alkylarylene groups wherein both the alkyl and the aryl portions form the linkage between the two CO groups, such as

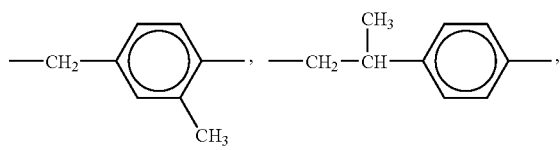

and the like, and (b) alkylarylene groups wherein only the aryl portion forms the linkage between the two CO groups, such as

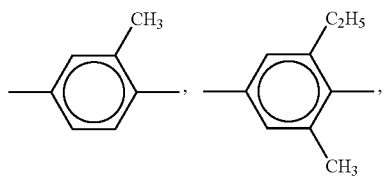

and $R_3$ is (i) an alkylene group (including linear, branched, saturated, unsaturated, cyclic, substituted, and unsubstituted alkylene groups, and wherein hetero atoms, such as oxygen, nitrogen, sulfur, silicon, phosphorus, boron, and the like either may or may not be present in the alkylene group), in one embodiment with at least about 2 carbon atoms, and in one embodiment with no more than about 80 carbon atoms, in another embodiment with no more than about 60 carbon atoms, in yet another embodiment with no more than about 50 carbon atoms, and in still another embodiment with no more than about 36 carbon atoms, although the number of carbons atoms can be outside of these ranges (ii) an arylene group (including substituted and unsubstituted arylene groups, and wherein hetero atoms, such as oxygen, nitrogen, sulfur, silicon, phosphorus, boron, and the like either may or may not be present in the arylene group), in one embodiment with at least about 6 carbon atoms, and in another embodiment with at least about 6 carbon atoms, and in one embodiment with no more than about 50 carbon atoms, in another embodiment with no more than about 25 carbon atoms, and in yet another embodiment with no more than about 18 carbon atoms, although the number of carbon atoms can be outside of these ranges, (iii) an arylalkylene group (including substituted and unsubstituted arylalkylene groups, and wherein hetero atoms, such as oxygen, nitrogen, sulfur, silicon, phosphorus, boron, and the like either may or may not be present in either the aryl or the alkyl portion of the arylalkylene group), in one embodiment with at least about 7 carbon atoms, and in another embodiment with no more than about 80 carbon atoms, in another embodiment with no more than about 60 carbon atoms, in yet another embodiment with no more than about 50 carbon atoms, and in still another embodiment with no more than abiur 36 carbon atoms, although the number of carbon atoms can be outside these ranges, (iv) an alkylarylene group (including substituted and unsubstituted alkylarylene groups, and wherein hetero atoms, such as oxygen, nitrogen, sulfur, silicon, phosphorus, boron, and the like either may or may not be present in either the aryl or the alkyl portion of the alkylarylene group), in one embodiment with at least about 7 carbon atoms, and in one embodiment with no more than about 80 carbon atoms, in another embodiment with no more than about 60 carbon atoms, in yet another embodiment with no more than about 50 carbon atoms, and in still another embodiment with no more than about 36 carbon atoms, although the number of carbon atoms can be outside these ranges, and $R_4$ and $R_5$ each, independently of the other, is (i) a hydrogen atom, (ii) an alkyl group (including linear, branched, saturated, unsaturated, substituted, and unsubstituted alkyl groups), in one embodiment with at least 1 carbon atom, and in one embodiment with no more than about 3 carbon atoms, although the number of carbon atoms can be outside of these ranges, wherein the substituents on the substituted alkyl, alkylene, aryl, arylene, arylalkyl, arylalkylene, alkylaryl, and alkylarylene groups in $R_1, R_1', R_2, R_2', R_3, R_4,$ and $R_5$ can be (but are not limited to) halogen atoms, including fluorine, chlorine, bromine, and iodine atoms, imine groups, ammonium groups, cyano groups, pyridinium groups, ether groups, aldehyde groups, ketone groups, ester groups, carbonyl groups, thiocarbonyl groups, sulfide groups, sulfoxide groups, phosphine groups, nitrile groups, mercapto groups, nitro groups, nitroso groups, sulfone groups, acyl groups, urethane groups, urea groups, mixtures thereof, and the like, wherein two or more substituents can be joined together to form a ring.

The ester terminated oligo-amide is present in the phase change ink in any desired or effective amount, in one embodiment at least about 0.11 percent by weight of the phase change ink, in another embodiment at least about 1 percent by weight of phase the phase change ink, and in yet another embodiment at least about 5 percent by weight of the phase change ink and in one embodiment no more than about 30 percent by weight of the phase change ink, in another embodiment no more than about 20 percent by weight of phase change ink, and in yet another embodiment no more than about 15 percent by weight of the phase change ink, although the amount can be outside these ranges. The ester terminated oligo-amides can be prepared by any effective method that enables the desired polydispersity. A method can be provided for producing an ink composition comprising forming an ester terminated oligo-amide material with a substantially low polydispersity by a sequentially controlled polymerization. Such a sequential controlled polymerization can comprise (1) reacting (A) a diacid having the formula $HO_2C$—$R_2$—$CO_2H$, wherein $R_2$=alkylene, arylene, alkylarylene or arylalkylene, with (B) a diamine having the formula

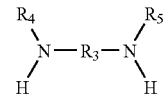

wherein $R_3$=alkylene, arylene, arylalkylene or alkylarylene, $R_4$ and $R_5$=hydrogen or alkyl. Next, in reaction (2), the product formed in reaction (1) is reacted with (C) a diacid having the formula $HO_2C$—$R_2$—$CO_2H$, wherein $R_2$=alkylene, arylene, alkylarylene or arylalkylene, and with (D) a monoalcohol having the formula $R_1$-OH, wherein $R_1$=alkyl, aryl, arylalkyl, or alkylaryl, to form the ester terminated oligo-amide material. Then, in (3), the ester terminated oligo-amide material can be combined with other ink components and a colorant to form the ink composition.

For example, one embodiment, the ester terminated oligo-amides, with n=2 can be prepared as follows: A diacid of the formula $HO_2C$—$R_2$—$CO_2H$ can be reacted with about 2 moles of an activating agent at about 0° C. in the presence of a catalyst and a solvent. After stirring the mixture for approximately twenty minutes, the mixture is then reacted with about 2 moles of diamine of formula

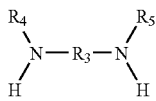

at room temperature in the presence of a solvent to give reaction mixture (I). In a different flask, about 2 moles of a diacid of the formula $HO_2C-R_2-CO_2H$ are reacted with about 4 moles of the activating agent in the presence of a catalyst and solvent at 0° C. Reaction mixture (I) is then added to this mixture and allowed to react at room temperature. The resulting product (II) is reacted at room temperature with about 2 moles of monoalcohol of the formula $R_1$—OH per each 1 mole of product. The reaction can proceed as follows;

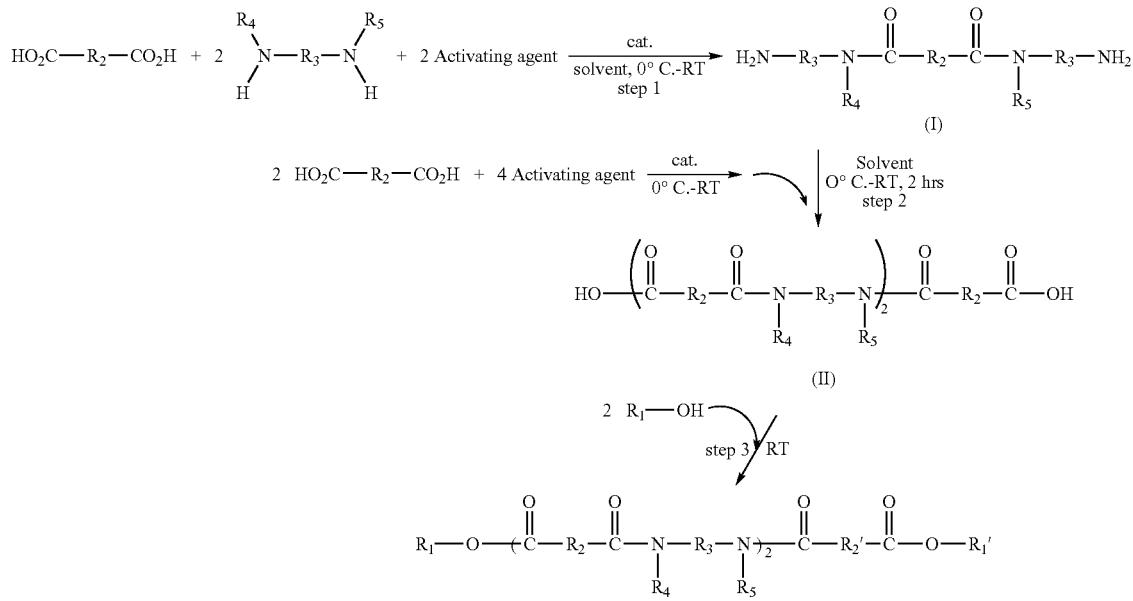

For a product with n approximately equal to 4, reaction product (II) is reacted with about 2 moles of diamine per mole of reaction product (II), the resulting product is then reacted with about 2 moles of diacid followed by about 2 moles of monoalcohol. For a product with n approximately equal to 6, four more steps are added, and so on.

Examples of a suitable activating agent includes 1,3-dicyclohexyl carbodiimide (DCC), 1-[3-(dimethylamino)propyl] 3-ethylcarbodiimide HCl(EDCl), N,N-carbonyldiimidazole, 1-Cyclohexyl-3-(2-morpholinoethyl)-carbodiimide Metho-p-toluenesulfonate, Benzotriazol-1-yloxyrris(dimethylamino)phosphonium hexaflourophosphate (BOP), O-Benzotriazol-1-yl-N,N,N',N'-tetramethyluronium Hexaflourophosphate (HBTU), Bis(2-oxo-3-oxazolidinyl) phosphonic Chloride (BOP-Cl), (1H-1,2,3-benzotriazol-1yloxy)tris(pyrrolidino)phosphonium hexaflouro phosphate (PyBOP), and the like. The activating agent is present in any desired or effective amount, in one embodiment at least about 1.8 moles of activating agent per mole of diacid, in another embodiment at least about 2 moles of activating agent per mole of diacid, in yet another embodiment at least about 2.2 moles of activating agent per mole of diacid, and in one embodiment no more than about 3 moles of activating agent per mole of diacid, in another embodiment no more than about 2.8 moles of activating agent per mole of diacid, in yet another embodiment no more than about 2.5 moles of activating agent per mole of diacid, although the amount can be outside of these ranges.

The diacid and the activating agent are reacted for any desired or effective period of time, in one embodiment at least about 5 minutes, in another embodiment at least about 10 minutes, in yet another embodiment at least about 15 minutes, and in one embodiment equal to or less than about 90 minutes, in another embodiment equal to or less than about 60 minutes, and in yet another embodiment equal to or less than about 30 minutes, although the time can be outside of these ranges.

Examples of suitable catalysts include Dimethyl amino pyridine (DMAP), Triethylamine, 1,8-Diazabicyclo[5.4.0] undec-7-ene (DBU), and the like. The catalyst is present in any desired or effective amount, in one embodiment at least about 0.05 moles of catalyst per mole of diacid, in another embodiment at least about 0.1 mole of catalyst per mole of diaicid, in yet another embodiment about 0.2 moles of catalyst per mole of diacid, and in one embodiment not more than about 1.0 mole of catalyst per mole of diacid, in another embodiment not more than about 0.8 moles of catalyst per mole diacid, and in yet another embodiment not more than about 0.5 mole of catalyst per mole of diacid, although the amount can be outside these ranges.

The diacid and the diamine in step 1 are present in any desired or effective amount, in one embodiment at least about 1.75 moles of diamine per mole of diacid, in another embodiment at least about 1.9 moles of diamine per mole of diacid, in yet another embodiment at least about 2 moles of diamine per mole of diacid, and in one embodiment no more than about 2.5 moles of diacid per mole of diacid, in another embodiment no more than about 2.3 moles of diacid per mole of diacid, and in yet another embodiment no more than 2.1 moles of diacid per mole diacid, although the amounts can be outside these ranges.

The diacid and diamine in step 1 can be reacted for any desired or period of time, in one embodiment at least about 1 hr, in another embodiment at least about 2 hrs, in yet another embodiment at least about 5 hrs, and in one embodiment no more than about 20 hrs, in another embodiment no more than about 15 hrs, and in yet another embodiment no more than about 10 hrs, although the time can be outside these ranges.

The first reaction product and the diacid in step 2 are present in any desired or effective amount, in one embodiment about 1.75 moles of diacid per mole of reaction product (I), in another embodiment at least about 1.9 moles of diacid per mole of reaction product (I), in yet another embodiment at least about 2 moles of diacid per mole of reaction product (I), and in one embodiment no more than about 2.3 moles of diacid per mole of reaction product (I), in another embodiment no more than about 2.2 moles of diacid per mole reaction product (I), and in yet another embodiment no more than about 2.1 moles of diacid per mole of reaction product (I), although the amounts can be outside these ranges.

The activating agent in step 2 and the reaction product (I) are present in any desired or effective amount, in one embodiment at least about 3,8 moles of activating agent per mole of reaction product (I), in another embodiment at least about 4.0 moles of activating agent per mole of reaction product (I), and yet in another embodiment at least about 4.2 moles of activating agent per mole of reaction product (I), and in one embodiment no more than about 5 moles of activating agent per mole of reaction product (I), in another embodiment not more than about 4.8 moles of activating agent per mole of reaction product (I), and in yet another embodiment not meore than about 4.5 moles of activating agent per mole of reaction product (I), although the amount can be outside these ranges.

The diacid and reaction product (I) can be reacted for any desired period of time, in one embodiment at least about 1 hr, in another embodiment at least about 2 hrs, in yet another embodiment at least about 5 hrs, and in one embodiment no more than about 20 hrs, in another embodiment no more than about 15 hrs, and in yet another embodiment no more than about 10 hrs, although the time can be outside these ranges.

The reaction product (II) and the monoalcohol are present in any desired or effective relative amounts, in one embodiment at least about 1.75 moles of monoalcohol per mole of reaction product (II), in another embodiment at least about 2.0 moles of monoalcohol per mole of reaction product (II), in yet another embodiment at least about 2.25 moles of monoalcohol per mole of reaction product (II), and in another embodiment no more than about 3.00 moles of monoalcohol per mole of reaction product (II), in another embodiment no more than about 2.75 moles of monoalcohol per mole of reaction product (II), in yet another embodiment no more than about 2.5 moles of monoalcohol per mole of reaction product (II), although the amount can be outside these ranges.

Examples of suitable solvents for steps 1, 2 and 3 include (but are not limited to) dichloromethane, tetrahydrofuran, methyl ethyl ketone, toluene, dimethyl formamide, diethyl ether, hexane, ethyl acetate, and the like, as well as mixtures. Thereafter, the product can be isolated by filtration of any solid by-products, or washing the solution with water depending on the activating agent used. The solvent can be removed by rotovap. If needed the product can be purified by washing with acetone and drying.

The process outlined above enables the synthesis of ester terminated oligo-amides having a relatively low polydispersity. The ester terminated oligo-amide material in one embodiment has a polydispersity (Pd) of not more than about 1.80, in another embodiment a polydispersity (Pd) of not more than about 1.75. Furthermore, in certain embodiments ester terminated oligo-amide material can have a polydispersity (Pd) of not more than about 1.70, and in other embodiments ester terminated oligo-amide material preferably can have a polydispersity (Pd) of not more than about 1.65. Polydispersity is a measure of the molecular weight distribution of a polymer or oligomer. A polydispersity of 1.0 indicates a very narrow distribution. As the distribution become wider, i.e., more oligomers or polymer chains with different n values, the Pd value increases. The Pd for ester terminated oligo-amide materials formed by thermal condensation is greater than about 1.80.

In contrast to thermal condensation techniques, the ink of herein produced containing oligo-amides of narrow polydispersity are synthesized by a sequentially controlled synthetic procedure. Exemplary reaction equations for the controlled synthesis for preparing the ester terminated oligo-amides where n is approximately equal to 2, 4 and 6. For ester terminated oligo-amides where n=2, the reaction described as steps 1 to 3 is followed. For ester terminated oligo-amides where n=4, two more steps are added. For ester terminated oligo-amides where n=6, four more steps are added. The stepwise, sequential addition was designed to prevent the formation of a mixture of oligomers with different n values resulting in oligomers with a high polydispersity. Stated another way, in order to form ester terminated oligo-amides having a low polydispersity, a stepwise, sequential polymerization is conducted to first produce an oligo-amide product where n=2. Then, the n=4 or 6 ester terminated oligo-amides are formed in a stepwise, sequential manner from the product where n=2. Accordingly, the resultant n=2, 4 or 6 products have a minimum amount of mixed oligomers. This procedure formed oligomers with a narrow polydispersity compared to oligimers prepared by thermal condensation.

The oligo-amides synthesized by the sequentially controlled polymerization process outlined above have a narrow polydispersity compared to a commercial sample Uniclear 100 made by thermal condensation. This indicates that the method described in this disclosure give oligo-amides with a narrow distribution.

Phase change inks as disclosed herein include a phase change carrier system or composition. The phase change carrier composition is typically designed for use in either a direct printing mode or an indirect or offset printing transfer system.

In the direct printing mode, the phase change carrier composition in one embodiment contains one or more materials that enable the phase change ink (1) to be applied in a thin film of uniform thickness on the final recording substrate (such as paper, transparency material, and the like) when cooled to ambient temperature after printing directly to the recording substrate, (2) to be ductile while retaining sufficient flexibility so that the applied image on the substrate will not fracture upon bending, and (3) to possess a high degree of lightness, chroma, transparency, and thermal stability.

In an offset printing transfer or indirect printing mode, the phase change carrier composition in one embodiment exhibits not only the characteristics desirable for direct printing mode inks, but also certain fluidic and mechanical properties desirable for use in such a system, as described in, for example, U.S. Pat. No. 5,389,958 the disclosure of which is totally incorporated herein by reference.

Any desired or effective carrier composition can be used. Examples of suitable ink carrier materials include fatty amides, such as monoamides, tetra-amides, mixtures thereof, and the like. Specific examples of suitable fatty amide ink carrier materials include stearyl stearamide, a dimer acid based tetra-amide that is the reaction product of dimer acid, ethylene diamine, and stearic acid, a dimer acid based tetra-amide that is the reaction product of dimer acid, ethylene diamine, and a carboxylic acid having at least about 36 carbon atoms, and the like, as well as mixtures thereof. When the fatty amide ink carrier is a dimer acid based tetra-amide that is the reaction product of dimer acid, ethylene diamine, and a carboxylic acid having at least about 36 carbon atoms, the carboxylic acid is of the general formula

wherein R is an alkyl group, including linear, branched, saturated, unsaturated, and cyclic alkyl groups, said alkyl group in one embodiment having at least about 36 carbon atoms, in another embodiment having at least about 40 carbon atoms, said alkyl group in one embodiment having no more than about 200 carbon atoms, in another embodiment having no more than about 150 carbon atoms, and in yet another embodiment having no more than about 100 carbon atoms, although the number of carbon atoms can be outside of these ranges. Carboxylic acids of this formula are commercially available from, for example, Baker Petrolite, Tulsa, Okla., and can also be prepared as described in Example 1 of U.S. Pat. No. 6,174,937, the disclosure of which is totally incorporated herein by reference. Further information on fatty amide carrier materials is disclosed in, for example, U.S. Pat. Nos. 4,889,560, 4,889,761, 5,194,638, 4,830,671, 6,174,937, 5,372,852, 5,597,856, 6,174,937, and British Patent GB 2 238 792, the disclosures of each of which are totally incorporated herein by reference.

Also suitable as phase change ink carrier materials are isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. Nos. 5,750,604, 5,780,528, 5,782,966, 5,783,658, 5,827,918, 5,830,942, 5,919,839, 6,255,432, 6,309,453, British Patent GB 2 294 939, British Patent GB 2 305 928, British Patent GB 2 305 670, British Patent GB 2 290 793, PCT Publication WO 94/14902, PCT Publication WO 97/12003, PCT Publication WO 97/13816, PCT Publication WO 96/14364, PCT Publication WO 97/33943, and PCT Publication WO 95/04760, the disclosures of each of which are totally incorporated herein by reference.

Mixtures of fatty amide materials and isocyanate-derived materials can also be employed as the ink carrier composition.

Additional suitable phase change ink carrier materials include paraffins, microcrystalline waxes, polyethylene waxes, ester waxes, amide waxes, fatty acids, fatty alcohols, such as the UNILIN® products available from Baker Petrolite, Tulsa, Okla., fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. One or more of these materials can also be employed in a mixture with a fatty amide material and/or an isocyanate-derived material.

The ink carrier can also optionally contain an antioxidant. The optional antioxidants protect the images from oxidation and also protect the ink components from oxidation during the heating portion of the ink preparation process. Specific examples of suitable antioxidants include NAUGUARD® 445, NAUGUARD® 524, NAUGUARD® 76, and NAUGUARD® 512 (commercially available from Uniroyal Chemical Company, Oxford, Conn.), IRGANOX® 1010 (commercially available from Ciba Geigy), and the like. When present, the optional antioxidant is present in the ink in any desired or effective amount, in one embodiment of at least about 0.01 percent by weight of the ink carrier, in another embodiment of at least about 0.1 percent by weight of the ink carrier, and in yet another embodiment of at least about 1 percent by weight of the ink carrier, and in one embodiment of no more than about 20 percent by weight of the ink carrier, in another embodiment of no more than about 5 percent by weight of the ink carrier, and in yet another embodiment of no more than about 3 percent by weight of the ink carrier, although the amount can be outside of these ranges.

The ink carrier can also optionally contain a viscosity modifier. Examples of suitable viscosity modifiers include aliphatic ketones, such as stearone, and the like. When present, the optional viscosity modifier is present in the ink in any desired or effective amount, in one embodiment of at least about 0.1 percent by weight of the ink carrier, in another embodiment of at least about 1 percent by weight of the ink carrier, and in yet another embodiment of at least about 10 percent by weight of the ink carrier, and in one embodiment of no more than about 99 percent by weight of the ink carrier, in another embodiment of no more than about 30 percent by weight of the ink carrier, and in yet another embodiment of no more than about 15 percent by weight of the ink carrier, although the amount can be outside of these ranges.

Other optional additives to the ink carrier include clarifiers, such as UNION CAMP® X37-523-235 (commercially available from Union Camp), in an amount in one embodiment of at least about 0.01 percent by weight of the ink carrier, in another embodiment of at least about 0.1 percent by weight of the ink carrier, and in yet another embodiment of at least about 5 percent by weight of the ink carrier, and in one embodiment of no more than about 98 percent by weight of the ink carrier, in another embodiment of no more than about 50 percent by weight of the ink carrier, and in yet another embodiment of no more than about 10 percent by weight of the ink carrier, although the amount can be outside of these ranges, tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 and KE-100 Resins, triglycerides of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), and the like, in an amount in one embodiment of at least about 0.1 percent by weight of the ink carrier, in another embodiment of at least about 5 percent by weight of the ink carrier, and in yet another embodiment of at least about 10 percent by weight of the ink carrier, and in one embodiment of no more than about 98 percent by weight of the ink carrier, in another embodiment of no more than about 75 percent by weight of the ink carrier, and in yet another embodiment of no more than about 50 percent by weight of the ink carrier, although the amount can be outside of these range, adhesives, such as VERSAMID® 757, 759, or 744 (commercially available from Henkel), in an amount in one embodiment of at least about 0.1 percent by weight of the ink carrier, in another embodiment of at least about 1 percent by weight of the ink carrier, and in yet another embodiment of at least about 5 percent by weight of the ink carrier, and in one embodiment of no more than about 98 percent by weight of the ink carrier, in another embodiment of no more than about 50 percent by weight of the ink carrier, and in yet another embodiment of no more than about 10 percent by weight of the ink carrier, although the amount can be outside of these ranges, plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like, in an amount in one embodiment of at least about 0.1 percent by weight of the ink carrier, in another embodiment of at least about 1 percent by weight of the ink carrier, and in yet another embodiment of at least about 2 percent by weight of the ink carrier, and in one embodiment of no more than about 50 percent by weight of the ink carrier, in another embodiment of no more than about 30 percent by weight of the ink carrier, and in yet another embodiment of no more than about 10 percent by weight of the ink carrier, although the amount can be outside of these ranges, and the like.

The ink carrier is present in the phase change ink in any desired or effective amount, in one embodiment of at least about 25 percent by weight of the ink, in another embodiment of at least about 50 percent by weight of the ink, and in yet another embodiment of at least about 90 percent by weight of the ink, and in one embodiment of no more than about 99 percent by weight of the ink, in another embodiment of no more than about 98 percent by weight of the ink, and in yet another embodiment of no more than about 95 percent by weight of the ink, although the amount can be outside of these ranges.

In one specific embodiment, the ink carrier has a melting point of less than about 110° C., and in another embodiment of less than about 100° C., although the melting point of the ink carrier can be outside of these ranges.

The phase change ink compositions also contain a colorant. Any desired or effective colorant can be employed, including dyes, pigments, mixtures thereof, and the like, provided that the colorant can be dissolved or dispersed in the ink vehicle. The phase change carrier compositions can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Ciba-Geigy); Direct Brilliant Pink B (Crompton & Knowles); Aizen Spilon Red C-BH (Hodogaya Chemical); Kayanol Red 3BL (Nippon Kayaku); Levanol Brilliant Red 3BW (Mobay Chemical); Levaderm Lemon Yellow (Mobay Chemical); Spirit Fast Yellow 3G; Aizen Spilon Yellow C-GNH (Hodogaya Chemical); Sirius Supra Yellow GD 167; Cartasol Brilliant Yellow 4GF (Sandoz); Pergasol Yellow CGP (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc. A (Morton-Thiokol); Diaazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 26050] (BASF), Intratherm Yellow 346 from Crompton and Knowles, C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. Nos. 5,621,022 and 5,231,135, the disclosures of each of which are totally incorporated herein by reference, and commercially available from, for example, Milliken & Company as Milliken Ink Yellow 12, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Pigments are also suitable colorants for the phase change inks. Examples of suitable pigments include Violet Toner VT-8015 (Paul Uhlich); Paliogen Violet 5100 (BASF); Paliogen Violet 5890 (BASF); Permanent Violet VT 2645 (Paul Uhlich); Heliogen Green L8730 (BASF); Argyle Green XP-111-S (Paul Uhlich); Brilliant Green Toner GR 0991 (Paul Uhlich); Lithol Scarlet D3700 (BASF); Toluidine Red (Aldrich); Scarlet for Thermoplast NSD PS PA (Ugine Kuhlmann of Canada); E.D. Toluidine Red (Aldrich); Lithol Rubine Toner (Paul Uhlich); Lithol Scarlet 4440 (BASF); Bon Red C (Dominion Color Company); Royal Brilliant Red RD-8192 (Paul Uhlich); Oracet Pink RF (Ciba-Geigy); Paliogen Red 3871K (BASF); Paliogen Red 3340 (BASF); Lithol Fast Scarlet L4300 (BASF); Heliogen Blue L6900, L7020 (BASF); Heliogen Blue K6902, K6910 (BASF); Heliogen Blue D6840, D7080 (BASF); Sudan Blue OS (BASF); Neopen Blue FF4012 (BASF); PV Fast Blue B2G01 (American Hoechst); Irgalite Blue BCA (Ciba-Geigy); Paliogen Blue 6470 (BASF); Sudan III (Red Orange) (Matheson, Colemen Bell); Sudan II (Orange) (Matheson, Colemen Bell); Sudan Orange G (Aldrich), Sudan Orange 220 (BASF); Paliogen Orange 3040 (BASF); Ortho Orange OR 2673 (Paul Uhlich); Paliogen Yellow 152, 1560 (BASF); Lithol Fast Yellow 0991K (BASF); Paliotol Yellow 1840 (BASF); Novoperm Yellow FGL (Hoechst); Permanent Yellow YE 0305 (Paul Uhlich); Lumogen Yellow D0790 (BASF); Suco-Yellow L1250 (BASF); Suco-Yellow D1355 (BASF); Suco Fast Yellow D1355, D1351 (BASF); Hostaperm Pink E (American Hoechst); Fanal Pink D4830 (BASF); Cinquasia Magenta (Du Pont); Paliogen Black L0084 (BASF); Pigment Black K801 (BASF); and carbon blacks such as Regal 330® (Cabot), Carbon Black 5250, Carbon Black 5750 (Columbia Chemical), and the like.

Also suitable are the colorants disclosed in 6,472,523, 6,726,755, 6,476,219, 6,576,747, 6,713,614, 6,663,703, 6,755,902, 6,590,082, 6,696,552, 6,576,748, 6,646,111, 6,673,139, Copending Application U.S. Ser. No. 10/260,146, filed Sep. 27, 2002, entitled "Colorant Compounds," and Copending Application U.S. Ser. No. 10/260,379, filed Sep. 27, 2002, entitled "Methods for Making Colorant Compounds," the disclosures of each of which are totally incorporated herein by reference.

Other ink colors besides the subtractive primary colors can be desirable for applications such as postal marking, industrial marking, and labeling using phase change printing, and the inks are applicable to these needs. Further, infrared (IR) or ultraviolet (UV) absorbing dyes can also be incorporated into the inks for use in applications such as "invisible" coding or marking of products. Examples of such infrared and ultraviolet absorbing dyes are disclosed in, for example, U.S. Pat. No. 5,378,574, 5,146,087, 5,145,518, 5,543,177, 5,225,900, 5,301,044, 5,286,286, 5,275,647, 5,208,630, 5,202,265, 5,271,764, 5,256,193, 5,385,803, and 5,554,480, the disclosures of each of which are totally incorporated herein by reference.

In a specific embodiment, the colorant is an isocyanate-derived colored resin as disclosed in, for example, U.S. Pat. Nos. 5,780,528 and 5,919,839, the disclosures of each of which are totally incorporated herein by reference. In this embodiment, the colorant is the reaction product of a hydroxyl-substituted or primary or secondary amino-substituted chromophore with an isocyanate. Examples of suitable isocyanates include monoisocyanates, diisocyanates, triisocyanates, copolymers of a diisocyanate, copolymers of a triisocyanate, polyisocyanates (having more than three isocyanate functional groups), and the like, as well as mixtures thereof. Specific examples of suitable isocyanates include those listed hereinabove as being suitable for reaction with the hydroxyl-substituted or amino-substituted antioxidant. Examples of suitable hydroxyl-substituted and primary or secondary amino-substituted chromophores include those disclosed in, for example, U.S. Pat. Nos. 3,157,633 3,927,044, 3,994,835, 4,102,644, 4,113,721 4,132,840, 4,137,243, 4,170,564, 4,284,729 4,507,407, 4,640,690, 4,732,570, 4,751,254, 4,751,254, 4,761,502, 4,775,748, 4,812,141, 4,846,846, 4,871,371, 4,912,203, 4,978,362, 5,043,013, 5,059,244, 5,149,800, 5,177,200, 5,270,363, 5,290,921, and 5,731,398, the disclosures of each of which are totally incorporated herein by reference. Hydroxyl-containing and primary or secondary amino-containing colorants from the classes of Color Index (C.I.) Solvent Dyes, Disperse Dyes, modified Acid and Direct Dyes, Basic Dyes, Sulphur Dyes, Vat Dyes, and the like can also be used. These colorants can also affect the rheological properties of the inks containing them.

The colorant is present in the phase change ink in any desired or effective amount to obtain the desired color or hue, in one embodiment at least about 0.1 percent by weight of the ink, in a further embodiment at least about 0.2 percent by weight of the ink, and in anther embodiment at least about 0.5 percent by weight of the ink, and in one embodiment no more than about 50 percent by weight of the ink, in a further embodiment no more than about 20 percent by weight of the ink, and in anther embodiment no more than about 10 percent by weight of the ink, although the amount can be outside of these ranges.

The ink compositions in one embodiment have melting points of no lower than about 40° C., in another embodiment of no lower than about 60° C., and in yet another embodiment of no lower than about 70° C., and have melting points in one embodiment of no higher than about 140° C., in another embodiment of no higher than about 120° C., and in yet another embodiment of no higher than about 100° C., although the melting point can be outside of these ranges.

The ink compositions generally have melt viscosities at the jetting temperature (in one embodiment no lower than about 75° C., in another embodiment no lower than about 100° C., and in yet another embodiment no lower than about 120° C., and in one embodiment no higher than about 180° C., and in another embodiment no higher than about 150° C., although the jetting temperature can be outside of these ranges) in one embodiment of no more than about 30 centipoise, in another embodiment of no more than about 20 centipoise, and in yet another embodiment of no more than about 15 centipoise, and in one embodiment of no less than about 2 centipoise, in another embodiment of no less than about 5 centipoise, and in yet another embodiment of no less than about 7 centipoise, although the melt viscosity can be outside of these ranges.

The ink compositions can be prepared by any desired or suitable method. For example, the ink ingredients can be mixed together, followed by heating, to a temperature in one embodiment of at least about 100° C., and in one embodiment of no more than about 140° C., although the temperature can be outside of these ranges, and stirring or milling until a homogeneous ink composition is obtained, followed by cooling the ink to ambient temperature (typically from about 20 to about 25° C.). The inks are solid at ambient temperature. In a specific embodiment, during the formation process, the inks in their molten state are poured into molds and then allowed to cool and solidify to form ink sticks.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In a specific embodiment, the intermediate transfer member is maintained at a temperature that enables ink printed thereon to form a gel phase prior to forming a solid phase. In one embodiment, the intermediate transfer member is heated to a temperature of from about 4° C. above to about 60° C. below the ink melting temperature, and in another embodiment, the intermediate transfer member is heated to a temperature of from about 2° C. above to about 50° C. below the ink melting temperature, although the temperature of the intermediate transfer member can be outside of these ranges. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, transparency materials, fabrics, textile products, plastics, polymeric films, inorganic substrates such as metals and wood, and the like.

Specific embodiments will now be described in detail. These examples are intended to be illustrative, and the claims are not limited to the materials, conditions, or process parameters set forth in these embodiments.

EXAMPLE 1

Oligo-amide (n~2)

Empol 1008 (20 mmol, 11.36 grams obtained from Cognis, Cincinnati, Ohio), a dimer diacid with a chain length of 36) was dissolved in dichloromethane (200 milliliters) in a 500 milliliter round bottomed flask under argon. The solution was cooled to 0° C. and dimethyl amino pyridine, DMAP(4 mmol, 0.48 gram, obtained from Sigma Aldrich Fine Chemicals, Milwauke, Wis.) was added to the solution. After the DAMP had dissolved, 1 M solution of dicyclohexyl carbodiimide (DCC) in dichloromethane (40 mmol, 40 milliliters, obtained from Sigma Aldrich Fine Chemicals) was added to the solution. The solution was stirred for 20 minutes, ethylene diamine (40 mmol, 2.4 grams, 2.67 milliliters, obtained from Sigma Aldrich Fine Chemicals) was added thereto, and the resultant solution was brought to room temperature. The solution was stirred for two hours at room temperature under Argon to form reaction intermediate (I). Empol 1008 (40 mmol, 22.72 grams) was dissolved in dichloromethane (400 ml) in a 1 L round bottomed flask under argon. The solution was cooled to 0° C. and DMAP (8 mmol, 0.96 grams) was added to the solution. After dissolving DMAP, a 1M solution of DCC in dichloromethane was added (80 mmol, 80 milliliters). The solution was stirred for 20 minutes, added to solution of reaction intermediate (I), and brought to room temperature. The solution was then stirred for two hours under Argon to give reaction intermediate (II). 1-Octadecanol (40 mmol, 10.82 grams, obtained from Sigma Aldrich Fine Chemicals) was added to this mixture and stirred for an additional one hour. The solution was filtered to remove dicyclohexyl urea by-product (DCHU). The filtrate was rotovaped and the crude product was washed with acetone, filtered and dried in a vacuum oven. The product was believed to be of formula

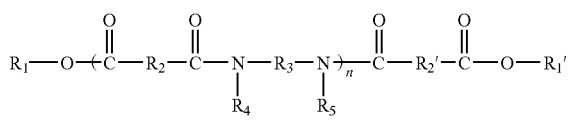

Wherein n~2, $R_1$ and $R_1'$ were both —$(CH_2)_{17}CH_3$, $R_2$ and $R_2'$ were both

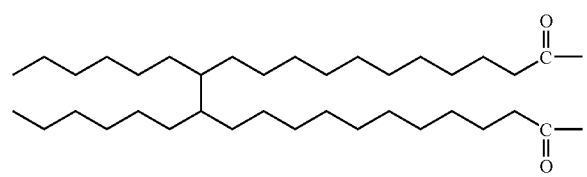

$R_3$ was —$CH_2CH_2$— and $R_4$ and $R_5$ are both hydrogen, (1H NMR analysis of the product indicated that n~2. $^1$H NMR (CDCL3 at room temperature); 0.9 ppm (multiplet, approx. 24 H integration, $CH_3$ groups), 1.1-1.9 ppm (multiplet), 2.18 (triplet, ~8 H integration, —$CH_2CONH$—), 2.29 ppm (triplet, 4H integration, —$CH_2COO$—), 3.37 (broad singlet, 8H integration, —NH—$CH_2CH_2$—NH—), 4.06 (triplet, 4H integration, $CH_3(CH_2)_{16}CH_2$). The physical properties of Example 1 are shown in Table 1.

EXAMPLE 2

Oligo-amide (n~2)

Example 2 was prepared in the same way as example 1 except that 1-decanol was used instead of 1-octadecanol. A white solid was obtained (32 grams 83% yield). The product was believed to be of formula

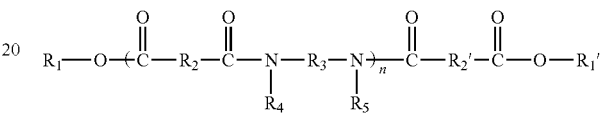

Wherein n~2, $R_1$ and $R_1'$ were both —$(CH_2)_9CH_3$, $R_2$ and $R_2'$ were both

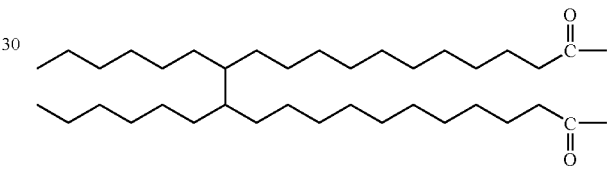

$R_3$ was —$CH_2CH_2$— and $R_4$ and $R_5$ were both hydrogen. The physical properties of Example 2 are shown in Table 1.

EXAMPLE 3

Oligo-amide (n~4)

Empol 1008 (20 mmols, 11.36 grams) was dissolved in dichloromethane (200 milliliters)) in a 500 milliliter round bottomed flask under argon. The solution was cooled to 0° C. and DMAP(4 mmols, 0.48 grams) was added to the solution. After the DMAP had dissolved, 1-[3-(dimetyhlamino)propyl] 3-ethylcarbodiimide HCl (EDCL) (40 mmols, 7.7 grams, obtained from Sigma Aldrich Fine Chemicals) was added to the solution. The solution was stirred for 20 minutes, ethylene diamine (40 mmols, 2.4 grams, 2.67 milliliters) was added, and the resultant solution brought to room temperature. This solution was then stirred for two hours at RT in an inert atmosphere to give complex (I). Empol 1008 (40 mmols, 22.72 grams) was dissolved in dichloromethane(400 milliliters) in a 1 L round bottomed flask under argon. The solution was cooled to 0° C. and DMAP (8 mmols, 0.96 grams) was added. After dissolving DMAP, EDCl (80 mmol, 15.4 grams) was added and it was stirred for 20 minutes. Solution (I) was added to this mixture and was brought to room temperature and stirred for 1 hour under argon. Ethylene diamine (40 mmols, 2.4 grams) was added to Solution (I) and the mixture was stirred for a further 2 hours to give solution (II). Empol 1008 (40 mmols, 22.72 grams) was dissolved in dichloromethane(400 milliliters) in a 2 L round bottomed flask under argon. The solution was cooled to 0° C. and DMAP (8 mmols, 0.96 grams) was added. After dissolving DMAP, EDCl (80 mmol, 15.4 grams) was added. The solution was stirred for 20 minutes and solution (II) was added to this mixture which was then brought to room temperature. The resultant solution was stirred for 2 hours under argon. 1-decanol (40 mmoles, 6.5 grams) was added to the solution, and the mixture was stirred for a further one hour to form solution (III). Solution (III) was washed with distilled water to eliminate EDCL. The organic layer was separated and dried with sodium sulfate. The solution was filtered and the filtrate rotovaped. The crude product was washed with acetone, filtered and dried in vacuum oven to give 52 grams of a white solid (85% yield). The product was believed to be of formula

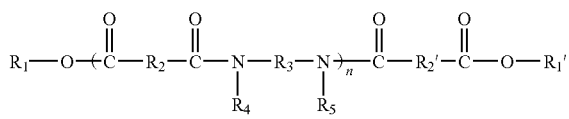

Wherein n~4, $R_1$ and $R_1'$ were both —$(CH_2)_9CH_3$, $R_2$ and $R_2'$ were both

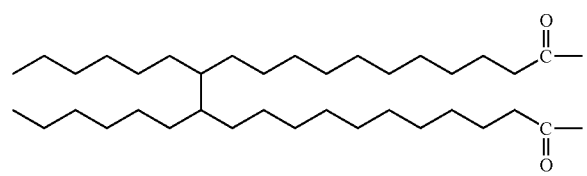

$R_3$ was —$CH_2CH_2$— and $R_4$ and $R_5$ are both hydrogen,

The physical properties of Example 2 are shown in Table 1.

EXAMPLE 4

Oligo-amide (n~6)

Empol 1008 (5 mmols, 2.84 grams) was dissolved in dichloromethane (50 milliliters) in a 250 milliliters round bottomed flask under argon. The solution was cooled (0° C.) and DMAP (1 mmol, 0.12 grams) was added. After the DMAP had dissolved, EDCl (10 mmols, 1.95 grams) was added. The solution was stirred for 20 minutes, ethylene diamine (10 mmol, 0.6 grams) was added, and the reaction mixture was warmed up to room temperature and stirred for a further two hours under nitrogen to give solution (I). Empol 1008 (10 mmol, 5.68 grams) was dissolved in dichloromethane (100 milliliters) in a 250 milliliters round bottomed flask. The solution was cooled (0°) and DMAP (2 mmol, 0.24 grams) was added. After dissolving DMAP, EDCl (20 mmol, 3.9 grams) was added and the solution was stirred for 20 minutes. Solution (I) was added to the resulting solution and stirred for an hour. Ethylene diamine (10 mmol, 0.6 grams) was added to the solution and the reaction mixture was brought to room temperature and stirred for two hours at RT under argon to give solution (II) Empol 1008 (10 mmol, 5.68 grams) was dissolved in 100 milliliters. of dichloromethane in a 250 milliliters round bottomed flask. The solution was cooled (0°) and DMAP (2 mmol, 0.24 grams) was added. After dissolving DMAP, EDCl (20 mmol, 3.9 grams) was added and the solution was stirred for 20 minutes. Solution (II) was then added to the resulting solution and stirred for an hour. Ethylene diamine (10 mmol, 0.6 grams) was added to the solution and the reaction mixture was brought to room temperature and stirred for two hours at RT under argon to give solution (III) Empol 1008 (10 mmol, 5.68 grams) was dissolved in dichloromethane (100 milliliters) in a 250 milliliters round bottomed flask. The solution was cooled (0°) and DMAP (2 mmol, 0.24 grams) was added. After dissolving DMAP, EDCl (20 mmol, 3.9 grams) was added and the solution was stirred for 20 minutes. Solution (III) was then added to the resulting solution and stirred for two hours at room temperature under Argon to give solution IV. 1-decanol (10 mmol, 1.58 grams) was added and stirred for further one hour. The resulting solution was washed with distilled water to eliminate EDCL using a separating funnel (Used saturated solution of NaCl to prevent emulsification with water). The organic layer was then separated and treated with sodium sulfate to remove traces of water. The solution was filtered to separate out sodium sulfate. The filtrate was rotovaped and the solid product washed with acetone. The product was filtered and dried in a vacuum oven to remove traces of acetone to give 14 grams of a white powder (65%). The product was believed to be of formula

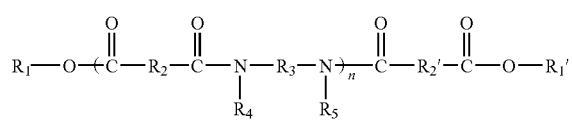

Wherein n~6, $R_1$ and $R_1'$ were both —$(CH_2)_9CH_3$, $R_2$ and $R_2'$ were both

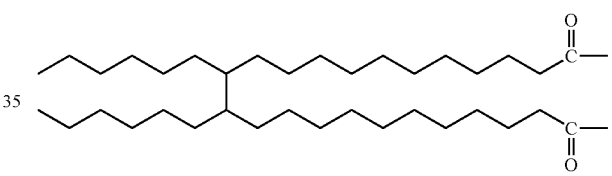

$R_3$ was $CH_2CH_2$— and $R_4$ and $R_5$ are both hydrogen.

EXAMPLE 5

Example 1 is repeated except that Isostearyl alcohol (available from UniQema, Wilmington, Del.) is used instead of 1-octadecanol. It is believed that the compound is of the formula

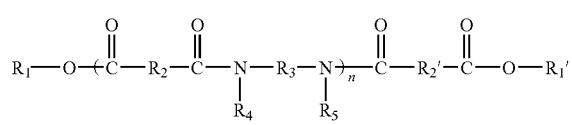

Wherein n~2, $R_1$ and $R_1'$ are both

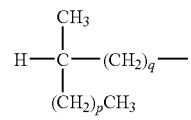

p and q are intergers of from 0 to 15, and the sum of p+q=15, and $R_2$ and $R_2'$ are both

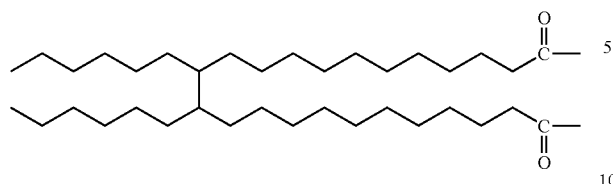

$R_3$ is —$CH_2CH_2$— and $R_4$ and $R_5$ are both hydrogen will be obtained.

EXAMPLE 6

Example 1 is repeated except that 4-phenylphenol (available from Sigma Aldrich Fine Chemicals) is used instead of 1-octadecanol. It is believed that the compound is of the formula

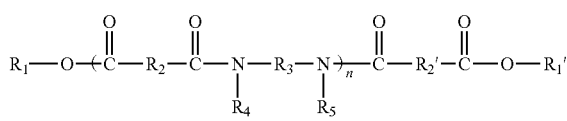

Wherein n~2. $R_1$ and $R_1'$ are both

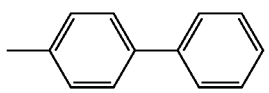

$R_2$ and $R_2'$ are both

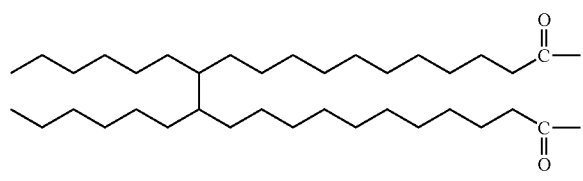

$R_3$ is —$CH_2CH_2$— and $R_4$ and $R_5$ are both hydrogen will be obtained.

Table 1 below shows the Gel Permeation Chromatography (GPC) results of the oligo-amides. The GPC was measured with a Waters 2690 Separation Module under the following conditions;

| Column: | Styragel HR 1, 3, 4, 5 and 6 in series (from Waters) |
|---|---|
| Mobile phase: | THF |
| Column temp: | 35 C. |
| Flow rate: | 1 ml/min |
| Injection volume: | 150 micro liter |

TABLE 1

Physical Properties of Ester-Terminated Oligo-Amides (ETOA)

| | GPC Results | | | DSC results | | |
|---|---|---|---|---|---|---|
| | Mn | Mw | Pd (Mw/Mn) | Crystallization point (Cp, °C.)) | Melting Point (Mp, °C.) | Viscosity (cps) at 100°C. |
| Uniclear 100 | 2933 | 5524 | 1.88 | 83.05 | 90.02 | $2.18 \times 10^3$ |
| Example 1 | 3037 | 4112 | 1.35 | 74.5 | not run | $1.56 \times 10^3$ |
| Example 2 | 2958 | 4785 | 1.61 | 77.90 | 87.98 | $1.61 \times 10^3$ |
| Example 3 | 3059 | 5038 | 1.65 | 81.23 | 91.05 | $8.07 \times 10^3$ |
| Example 4 | 4796 | 7703 | 1.72 | 89.90 | 102.42 | $8.96 \times 10^5$ |

Mn is number average molecular weight
Mw is weight average molecular weight
Pd is polydispersity The oligo-amides synthesized by the sequentially controlled polymerization process outlined above have a narrow polydispersity compared to the commercial sample Uniclear 100 made by thermal condensation. This demonstrates that the method described in this disclosure give oligo-amides with a narrow distribution.

INK EXAMPLE 1

A cyan ink composition was prepared in a beaker by adding (1) 29.38 grams (39.18 wt %) of polyethylene wax (PE 500, obtained from Baker Petrolite, Tulsa, Okla., a polyethylene homopolymer with an average chain length of C-36), (2) 26.59 grams (35.46 wt %) of a linear primary long chain alcohol (UNILIN® 425, obtained from Baker Petrolite, Tulsa, Okla., with an average chain length of C-30), (3) 3.54 grams (4.72 wt %) of a glycerol ester of hydrogenated (rosin) acid (KE-100, obtained from Arakawa Chemical Industries, Ltd, Osaka, Japan), (4) 2.36 gram (3.14 wt %) of an alkyl-benzyl phthalate of the formula

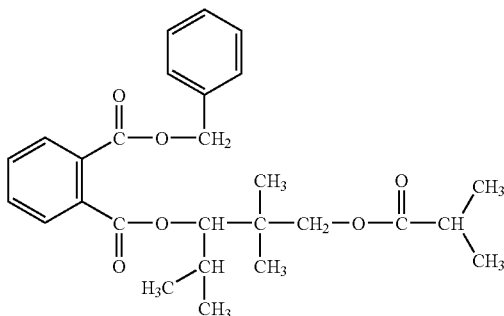

(SANTICIZER® 278, obtained from Ferro Corporation, Bridgeport, N.J.), (5) 0.09 gram (0.13 wt %) of NAUGUARD® 445 antioxidant (obtained from Uniroyal Chemical Co., Middlebury, Conn.), and (6) 1.44 grams (1.92 wt %) of Ethanox 310 antioxidant (obtained from Albermarle, Baton, Rouge, La.), and (7) 2.97 grams (3.96 wt %) of a tetra amide resin obtained from the reaction of one equivalent of dimer acid with two equivalents of ethylene diamine and UNICID® 700 (obtained from Baker Petrolite, Tulsa, Okla., a carboxylic acid derivative of a long chain alcohol), prepared as described in Example 1 of U.S. Pat. No. 6,174,937, the disclosure of which is totally incorporated herein by reference and (8) 5.37 grams (7.16 wt %) of the ester terminated oligo-amide prepared in Example II. The materials were melted together at a temperature of about 135° C. in a reaction block (from H+P Labortechnik GmbH, München) controlled with a telemodel 40CT, and stirred for about 2 hours at about 500 rpm. To this mixture was then added (9) 3.26 grams (4.35 wt %) of the cyan colorant disclosed in Example VIII of U.S. Pat. No. 6,472,523, the disclosure of which is totally incorporated herein by reference. The ink was stirred for about 2 additional hours and then cooled to room temperature. The cyan ink thus prepared exhibited a viscosity of about 9.35 centipoise as measured by an SR3000 Rheometrics parallel-plate viscometer at about 110° C. The ink thus formed was filtered through a heated MOTT® apparatus (obtained from Mott Metallurgical) using NAE 0.2 micron filter under a pressure of about 15 pounds per square inch. The filtered phase change ink was poured in an aluminum mold and allowed to solidify to form an ink stick.

INK EXAMPLE 2

A cyan ink was prepared as described in Ink Example 1 except that 7.86 parts by weight of the ester terminated oligo-amide prepared in example I was added. Relative amounts of the ingredients in this ink, expressed in percent by weight of the ink, is indicated in the table below. The cyan ink thus prepared exhibited a viscosity of about 10.30 centipoise as measured by an SR3000 Rheometrics at about 110° C.

INK EXAMPLE 3

A cyan ink was prepared as described in Ink Example 1 except that 7.16 parts by weight of the ester terminated oligo-amide prepared in example III was added. Relative amounts of the ingredients in this ink, expressed in percent by weight of the ink, is indicated in the table below. The cyan ink thus prepared exhibited a viscosity of about 11.34 centipoise as measured by an SR3000 Rheometrics parallel-plate viscometer at about 110° C.

INK EXAMPLE 4

A cyan ink was prepared as described in Ink Example 1 except that 7.16 parts by weight of the ester terminated oligo-amide prepared in example IV was added. Relative amounts of the ingredients in this ink, expressed in percent by weight of the ink, is indicated in the table below. The cyan ink thus prepared exhibited a viscosity of about 12.12 centipoise as measured by an SR3000 Rheometrics at about 110° C.

INK EXAMPLE 5

A cyan ink was prepared as described in Ink Example 2 except that 37.93 parts by weight of a distilled polyethylene wax (distilled PE 500, obtained from Baker Petrolite, Tulsa, Okla., a polyethylene homopolymer with an average chain length of C-36) was added. Relative amounts of the ingredients in this ink, expressed in percent by weight of the ink, is indicated in the table below. The cyan ink thus prepared exhibited a viscosity of about 10.30 centipoise as measured by an SR3000 Rheometrics at about 110° C.

COMPERATIVE INK EXAMPLE A

A cyan ink was prepared as described in Ink Example 1 except that 7.16 parts by weight of the commercial ester terminated polyamide (Uniclear 100, available from Arizona Chemicals, Jacksonville, Fla.) was used in place of the ester terminated oligo-amides. Relative amounts of the ingredients in this ink, expressed in percent by weight of the ink, are indicated in the table below. The cyan ink thus prepared exhibited a viscosity of about 11.03 centipoise as measured by an SR3000 Rheometrics at about 110° C.

TABLE 2

Ink formulations with ETOA 1, 2, 3 and 4 and commercial Uniclear 100

| Component Name | Ink1 | Ink 2 | Ink 3 | Ink4 | Ink5 | Comparative Ink A |
|---|---|---|---|---|---|---|
| Polywax_500 | 39.18 | 37.93 | 39.17 | 39.18 | 0 | 39.18 |
| Distilled PW 500 | 0 | 0 | 0 | 0 | 37.93 | 0 |
| Unilin_425 | 35.46 | 37.87 | 35.46 | 35.46 | 37.87 | 35.46 |
| ETOA Example 1 | 0 | 7.86 | 0 | 0 | 7.86 | 0 |
| ETOA Example 2 | 7.16 | 0 | 0 | 0 | 0 | 0 |
| ETOA Example 3 | 0 | 0 | 7.16 | 0 | 0 | 0 |
| ETOA example 4 | 0 | 0 | 0 | 7.16 | 0 | 0 |
| Uniclear_100 | 0 | 0 | 0 | 0 | 0 | 7.16 |
| KE_100 | 4.72 | 4.57 | 4.72 | 4.72 | 4.57 | 4.72 |
| N_445 | 0.13 | 0.12 | 0.13 | 0.13 | 0.12 | 0.13 |

TABLE 2-continued

Ink formulations with ETOA 1, 2, 3 and 4 and commercial Uniclear 100

| Component Name | Ink1 | Ink 2 | Ink 3 | Ink4 | Ink5 | Comparative Ink A |
|---|---|---|---|---|---|---|
| Ethanox 310 | 1.92 | 1.84 | 1.91 | 1.91 | 1.84 | 1.91 |
| S_278 | 3.14 | 3.04 | 3.14 | 3.14 | 3.04 | 3.14 |
| Tetra-amide Resin | 3.96 | 2.56 | 3.97 | 3.96 | 2.56 | 3.96 |
| BMD | 4.35 | 4.21 | 4.35 | 4.35 | 4.21 | 4.35 |
| Total | 100.00 | 100 | 100.00 | 100.00 | 100 | 100.00 |
| Viscosity @ 110° C. (cps) | 9.65 | 10.3 | 11.34 | 12.12 | 10.56 | 11.03 |

The ink viscosity increases as the n value of the ETOA increase. Use of the process described herein to make ETOA materials can be used to make ETOA materials of different chain length which can enable formulation of inks with different viscosities to suit different applications.

The inks of the present disclosure were printed on papers in the temperature range of 105 to 120 degree C. using a XEROX® Phaser 860 printer modified to enable printing at the desired temperatures. The printer used an indirect printing process producing images having excellent print quality and robustness. Table 3 shows the printing results for ink examples 1 and 3 and the comparative ink example A. Ink examples 1 and 3 made from the oligo-amides of the present disclosure had a much lower fold index indicating that they were more robust. These inks also had very low gouge area indicating that they had high scratch resistance. Overall these inks were more robust than the comparable low energy phase change inks which utilize oligo-amide Uniclear 100 instead of the subject ETOA materials. They were also more robust than various conventional phase change inks. This increase in robustness was attained by replacing the commercial oligo-amide which has a high polydispersity with ETOA materials which have a low polydispersity.

TABLE 3

Printing results

| 8200 Printing Mode | Conventional Phase Change Ink | Ink Example 1 | Ink Example 3 Drum temperature 50° C. | Ink Example 3 Drum temperature 46° C. | Comparative Ink Example A |
|---|---|---|---|---|---|
| Jetting Temperature ° C. | 140 | 113 | 113 | 113 | 109 |
| Drum Setpoint ° C. | 64 | 53 | 50 | 46 | 52 |
| 60° Gloss | 22.7 | 18.9 | 20.8 | 21.1 | 21.4 |
| Fold Index | 66.2 | 29.9 | 17 | 23 | 38.6 |
| Gouge Area | 1700 | 932 | 836 | 1027 | 1171 |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A phase change ink carrier comprising an ester terminated oligo-amide having a substantially low polydispersity, wherein the ester terminated oligo-amide is of the formula

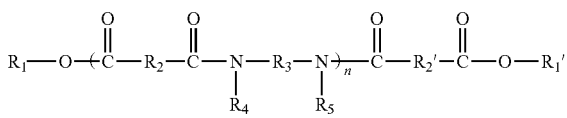

wherein n represents the number of repeating segments, and wherein $R_1$ and $R_1'$ are each, independently of the other, alkyl groups, and the ester terminated oligo-amide is prepared by other than a thermal condensation reaction.

2. An ink carrier according to claim 1, wherein $R_1$ and $R_1'$ is each, independently of the other, linear alkyl groups, branched alkyl groups, saturated alkyl groups, unsaturated alkyl groups, cyclic alkyl groups, substituted alkyl groups, unsubstituted alkyl groups, alkyl groups having hetero atoms, aryl groups, or mixtures thereof.

3. An ink carrier according to claim 1, wherein $R_2$ is and $R_2'$ are each, independently of the other, alkylene, arylene, alkylarylene, arylalkylene, or mixtures thereof.

4. An ink carrier according to claim 1, wherein $R_3$ is alkylene, arylene, arylalkylene, alkylarylene.

5. An ink carrier according to claim 1, wherein $R_4$ and $R_5$ are each, independently of the other, hydrogen or alkyl.

6. An ink carrier according to claim 1, wherein n is an integer which is 2, 4 or and 6.

7. An ink carrier according to claim 1, wherein the ester terminated oligo-amide has a polydispersity (Pd) of equal to or less than about 1.80.

8. An ink carrier according to claim 1, wherein the ester terminated oligo-amide has a polydispersity (Pd) of equal to or less than about 1.75.

9. An ink carrier according to claim 1, wherein the ester terminated oligo-amide is prepared by a sequential controlled polymerization.

10. An ink carrier according to claim 1, wherein the ester terminate doligo-amide is present in the ink carrier in an amount of at least about 1 percent by weight of the ink carrier and not more than about 30 percent by weight of the ink carrier.

11. A phase change ink which comprises (1) an ink carrier comprising a first component which comprises an ester terminated oligo-amide material having a substantially low polydispersity, wherein the ester terminated oligo-amide is of the formula

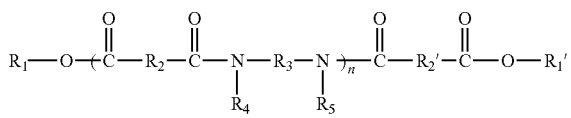

wherein n represents the number of repeating segments, and wherein $R_1$ and $R_1'$ are each, independently of the other, alkyl groups; and (2) a colorant, and wherein the ester terminated oligo-amide material is prepared by other than a thermal condensation reaction.

12. An ink according to claim 11, which is a solid at about 25° C. and possesses a jetting temperature of not more that about 120° C.

13. An ink according to claim 1, wherein the ink carrier further comprises at least one of (A) a polyalkylene wax, (B) a fatty amide, and (C) an isocyanate-derived material.

14. A method for producing a phase change ink composition comprising forming an ester terminated oligo-amide material with a substantially low polydispersity by a sequential controlled polymerization comprising (1) reacting (A) a diacid having the formula $HO_2C$—$R_2$—$CO_2H$, wherein $R_2$=alkylene, arylene, alkylarylene or arylalkylene, with (B) a diamine having the formula

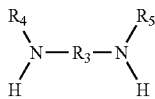

wherein $R_3$=alkylene, arylene, arylalkylene or alkylarylene, $R_4$ and $R_5$ each, independently of the other, are hydrogen or alkyl, (2) reacting the product formed in reaction (1) with (C) a diacid having the formula $HO_2C$—$R_2$—$CO_2H$, wherein $R_2$=alkylene, arylene, alkylarylene or arylalkylene and with (D) a monoalcohol having the formula $R_1$—OH, wherein $R_1$=alkyl, aryl, arylalkyl, or alkylaryl, to form said ester terminated oligo-amide material, (3) combining an ink carrier comprising said ester terminated oligo-amide with a colorant to form said ink composition.

15. A method according to claim 14, wherein the ester terminated oligo-amide material has a polydispersity (Pd) of equal to or less than about 1.80.

16. A method according to claim 14, wherein the sequential growth polymerization comprises a sequential growth solution polymerization.

17. A method according to claim 14, wherein the ester terminated oligo-amide material has a polydispersity (Pd) of equal to or less than about 1.75.

18. A method which comprises (a) incorporating into an ink jet printing apparatus a phase change ink composition comprising (1) a phase change ink carrier comprising a first component which comprises an ester terminated oligo-amide material having a substantially low polydispersity, wherein the ester terminated oligo-amide is of the formula

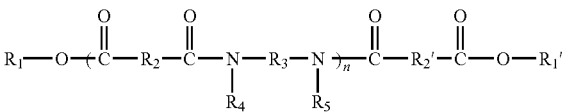

wherein n represents the number of repeating segments, and wherein $R_1$ and $R_1'$ are each, independently of the other, alkyl groups, and wherein the ester terminated oligo-amide material is prepared by other than a thermal condensation reaction; and (2) a colorant; (b) melting the ink; and (c) causing droplets of the melted ink to be ejected in an imagewise pattern onto a substrate.

19. A method according to claim 18, wherein the substrate is a final recording sheet and droplets of the melted ink are ejected in an imagewise pattern directly onto the final recording sheet.

20. A method according to claim 18, wherein the substrate is an intermediate transfer member and droplets of the melted ink are ejected in an imagewise pattern onto the intermediate transfer member followed by transfer of the imagewise pattern from the intermediate transfer member to a final recording sheet.

21. A method according to claim 20, wherein the intermediate transfer member is heated to a temperature above that of the final recording sheet and below that of the melted ink in the printing apparatus.

* * * * *